March 3, 1964

T. J. ELSTON 3,123,402

AUTOMOBILE SAFETY BELT ANCHOR CONSTRUCTION

Filed June 14, 1962

INVENTOR.
THOMAS J. ELSTON

BY Colman, Nord & Kress

ATTORNEYS

United States Patent Office 3,123,402
Patented Mar. 3, 1964

3,123,402
AUTOMOBILE SAFETY BELT ANCHOR
CONSTRUCTION
Thomas J. Elston, 3084 Southwind Drive,
Walled Lake, Mich.
Filed June 14, 1962, Ser. No. 202,449
3 Claims. (Cl. 297—385)

This invention relates to an automobile safety belt anchor construction and more particularly to an anchor plate which is secured to an automobile floor pan.

The invention involves an anchor plate for securement of a safety belt bolt having an area in contact with the bottom floor pan of an automobile and secured to the floor pan by welding, a punched threaded extrusion for securing a safety belt hook bolt and stiffening flanges or ribs at two sides of the plate to strengthen and stiffen the contact area. The plate is rectangular in plan, being longer than it is wide.

The benefits and advantages of the instant inventive anchor plate, over those presently known and available, include a one-piece construction, easier and simpler tooling for production, easier and simpler assembly to the floor pan, and substantial savings in the cost of installation of the anchor plate.

It is therefore an object of the invention to provide a simpler and less costly safety belt anchor floor plate for use with an automobile floor pan, as compared with those plates presently known in the art. Another object is to provide such a one-piece anchor plate as will be easy to produce and to assemble with the floor pan. A further object is to provide an anchor plate at a cost substantially below those presently known, used and available in the art.

These and additional objects of the invention and features of construction will become more clearly apparent from the description given below, in which the terms employed are used for purpose of description and not of limitation.

Reference is here made to the drawing annexed hereto and made an integral part thereof, and in which—

Figure 1:
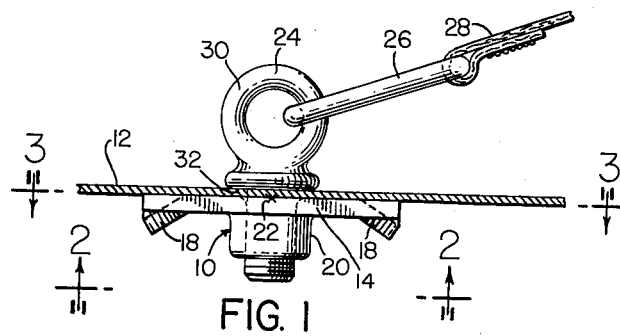
FIG. 1 is an end elevational view of the anchor plate of this invention secured to the bottom floor pan of an automobile shown fragmentarily.
Figure 2:
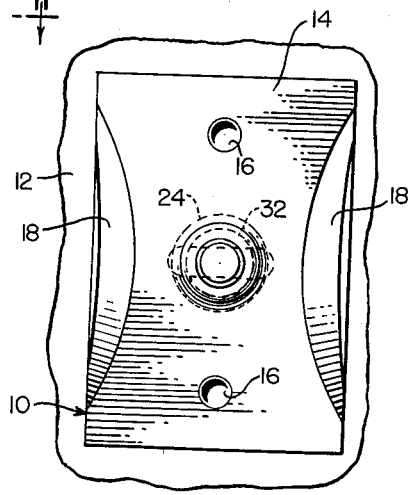
FIG. 2 is a bottom plan view of the construction shown in FIG. 1, taken substantially on the line 2—2 of FIG. 1.
Figure 3:
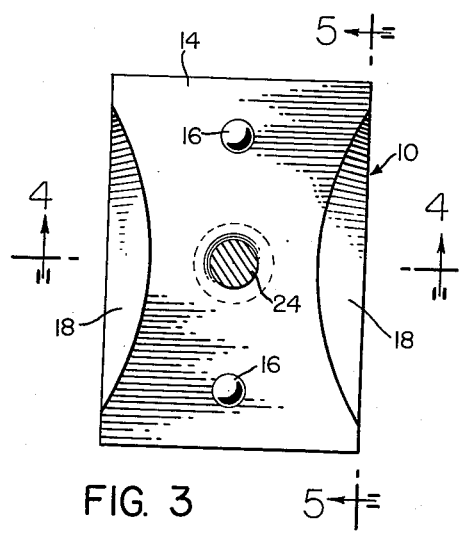
FIG. 3 is a top plan view of the anchor plate, taken substantially on the line 3—3 of FIG. 1.
Figure 4:
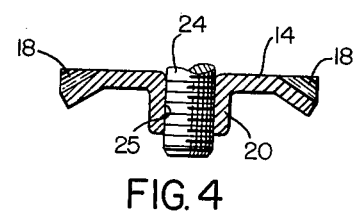
FIG. 4 is a traverse vertical sectional view taken substantially on the line 4—4 of FIG. 3.
Figure 5:
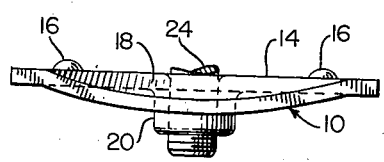
FIG. 5 is a side elevational view of the anchor plate, taken substantially on the line 5—5 of FIG. 3.

As shown in the several views of the drawing, the anchor plate 10 is assembled by welding to a portion of the automobile floor pan 12 and comprises a top contacting body 14 provided with welding projections 16, lateral flanges or ribs 18, and a punched threaded extrusion 20.

The plate body 14 which has a substantially larger area of contact and engagement with the bottom floor pan 12 than is present with anchor plates of the same outside dimensions presently known and available is fixedly secured to the floor pan 12 by welding the projections 16 to the floor pan.

Another plates of current construction comprise a flat body having two opposite lateral edge portions bent down into side flanges. Thus, the area of contact with the bottom pan is that which lies in the flat plane. In the instant construction, the plate body 14 is stiffened and strengthened by arcuate flanges that depend at an angle to the body plane. The flanges curve toward lateral edges of the body so that the area of contact with the bottom pan increases as the flanges gradually approach the lateral edges of the body. This increase in area provides a more efficient functioning of the anchor plate without loss of stiffness and strength provided by the arcuate flanges.

The lateral stiffening flanges or ribs 18 are bent at an angle of about 30° to the horizontal plane of the body 14 and provide substantial resistance to transverse distortion of the body, particularly at the medial area. The curved configuration of the flanges 18 at the body 14 provide increased contact area between the plate 10 and the bottom pan 12 to improve resistance against destruction upon increased loading of the plate.

A safety bolt 24 is threadedly engaged in the threaded bore 25 of the punched extrusion 20, after the assembly of the plate 10 to the floor pan 12. A belt hook 26 secured to the end of the belt 28 (shown fragmentarily only in FIG. 1) and to the eye 30 of the bolt 24 completes the conjunction of elements with which the plate 10 has been designed to cooperate. The belt hook 26 may be a snap-on hook or of other conventional construction. An opening 32 in the floor pan is provided for entry of the bolt 24, for engagement with the threaded portion 20.

In operation, the plate 10 is welded by spot welding to the bottom pan 12 at the projections 16, the floor pan opening 32 being in register with the threaded bore 25 of the punched extrusion 20. Bolt 24 is threaded into engagement with the threaded bore of the plate portion 20 until the bolt shoulder seats firmly against the floor pan 12. Thereafter the belt hook 26 at one end of belt 28 is engaged in the eye 30 of the bolt 24. At least two such plates 10 are required to secure the two ends of the safety belt 28 for use with one seat in an automobile.

The metal employed in making the anchor plate 10 is preferably a low carbon strip steel of from SAE 1005 to SAE 1010 grade, about ⅛ inch in thickness. A national fine thread for the bore 25 of the punched portion 20 is preferred over a coarser thread. Although steel of the range above set forth is preferred, it will be understood that another type or grade of steel with or without special surface coatings can be satisfactorily employed in this invention.

Having described the invention in its simplest form, it is to be understood that the features of construction may be changed and varied in greater or lesser degree without departing from the essence of the invention.

I claim:
1. In an anchor construction for securement of a safety belt at the bottom floor pan of an automobile.
    an anchor plate for said belt adapted to be secured to said floor pan and having
        a body of substantially rectilinear configuration,
        arcuate flanges extending longitudinally at the sides and at an angle to the plane of said body,
            said flanges being arced medially of said body and curving toward the side edges of said body so that the transverse distance between said arcs increases from the middle of said body, where said flanges are widest, until said arcs terminate at the side edges of said body, where said flanges terminate,
        and an extrusion integrally formed central of and normal to the plane of said body,
            said extrusion having a threaded bore axially thereof to threadedly engage an anchor bolt for securement of said safety belt.
2. The structure defined in claim 1, and in which
    said anchor plate body is provided with welding projections,
    said plate being welded and secured to said floor pan at said projections.

3. In an anchor construction for securement of a safety belt at the bottom floor pan of an automobile,
  an anchor plate for said belt adapted to be secured to said floor pan and having
    a body lying substantially in a plane,
      said body having at least two upstanding projections for welding said plate to said floor pan,
    a pair of arcuate flanges extending longitudinally at two sides and at an angle to the plane of said body,
      said flanges being arced medially of said body and curving toward the side edges of said body,
      said flanges depending from said body in planes at an angle of approximately 30° to the plane of said body,
      said flanges being widest at the midportion of said body and decreasing in width as said flanges extend toward each end of said arcs and toward the two side edges of said body,
    and an extrusion integrally formed central of and normal to and depending from said body,
      said extrusion having a threaded bore axially thereof to threadedly engage an anchor bolt for securement of said safety belt to said anchor plate.

References Cited in the file of this patent

UNITED STATES PATENTS

| | | |
|---|---|---|
| 2,813,726 | Leonard | Nov. 19, 1957 |
| 2,855,215 | Sheren | Oct. 7, 1958 |
| 2,932,871 | Phillips | Apr. 19, 1960 |
| 3,046,056 | Greene | July 24, 1962 |
| 3,080,634 | Lindblad | Mar. 12, 1963 |